Dec. 9, 1924.
I. V. DA SILVEIRA
1,518,693
LOCKING MEANS FOR RIMS
Filed June 16, 1922    2 Sheets-Sheet 1
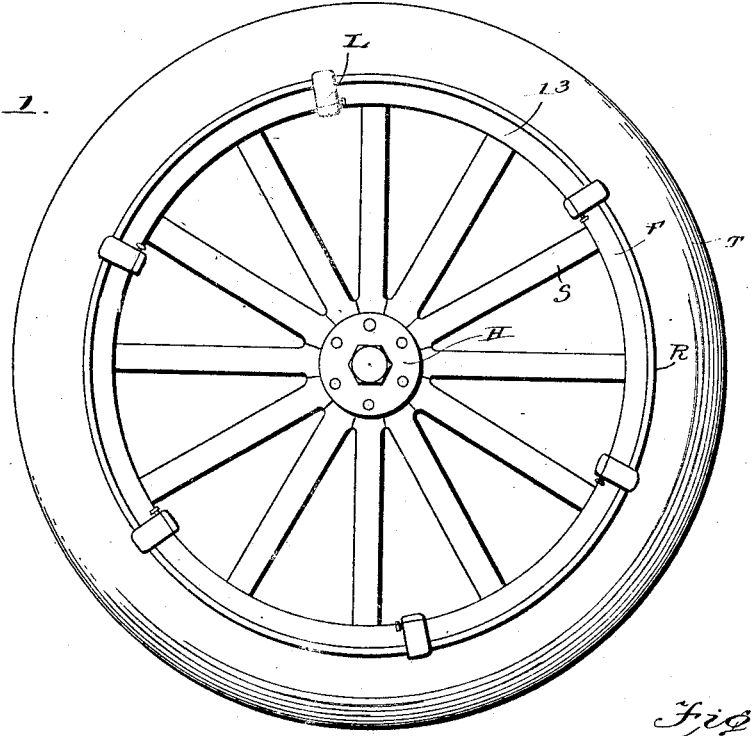
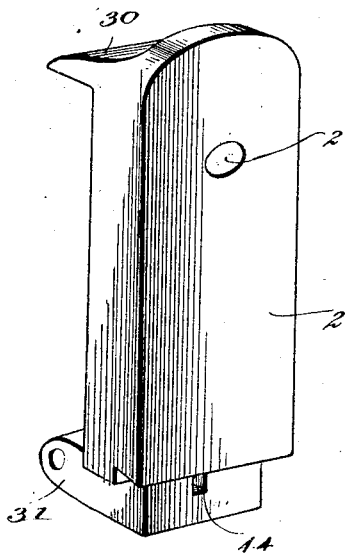
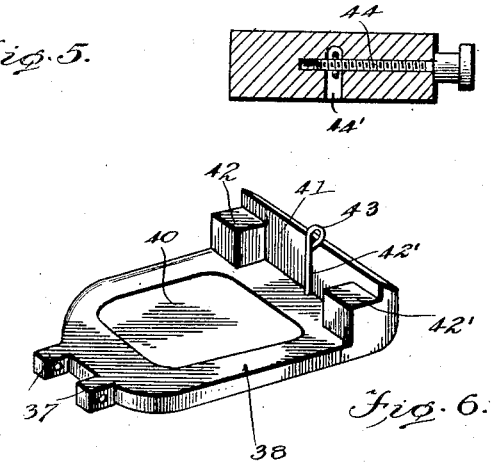
WITNESSES
INVENTOR
I. V. da Silveira,
BY
ATTORNEYS

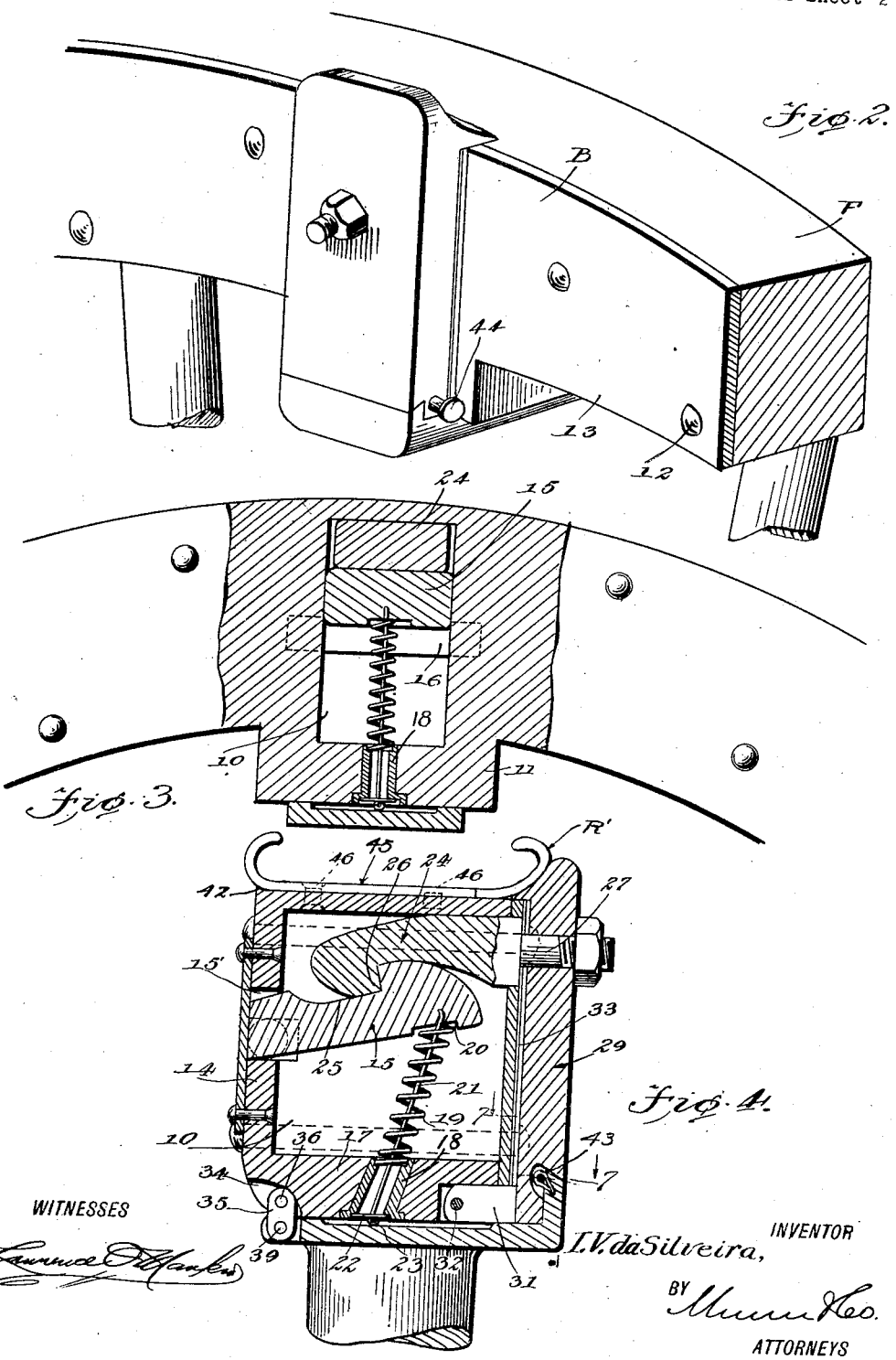

Patented Dec. 9, 1924.

1,518,693

UNITED STATES PATENT OFFICE.

ISAURO VICIRA DA SILVEIRA, OF FALLON, NEVADA.

LOCKING MEANS FOR RIMS.

Application filed June 16, 1922. Serial No. 568,755.

*To all whom it may concern:*

Be it known that I, ISAURO V. DA SILVEIRA, a citizen of Portugal, and a resident of Fallon, in the county of Churchill and State of Nevada, have invented certain new and useful Improvements in Locking Means for Rims, of which the following is a specification.

This invention relates to locking means for demountable rims for motor vehicles.

The object of the invention is to provide locking means which may be associated with any standard type of wheel having a suitable felly and which may be utilized for locking a demountable clincher ring upon said wheel.

It is a further object of the invention that the locking means may be associated and constructed with a wheel without increasing the cost of same to any great extent.

It is also within the objects of the invention that the locking means be simple in construction and positive in its operation.

Other objects will hereinafter appear.

The invention is illustrated by way of example in the accompanying drawings, in which:—

Figure 1 is a view in side elevation of a motor vehicle wheel showing the invention applied, Figure 2 is a perspective view of a fragmentary portion of a wheel and further illustrating the application of the invention, Figure 3 is a vertical sectional view taken through a locking link and longitudinally of the associated wheel felly, Figure 4 is a transverse sectional view taken through the locking unit and associated wheel felly, Figure 5 is an enlarged perspective view of the locking element employed in each locking unit of the present invention, Figure 6 is a similar view of the combined cover and mud guard employed in connection with each locking link, and Figure 7 is a detail sectional view showing the manner in which the cover or mud guard is held in its closed position.

Referring to the drawings more particularly, in Figure 1 H indicates the hub of the wheel, S the spokes therefor, F the felly, T the tire, R the tire rim and L the locking units of the present invention. In carrying out the invention the felly F is provided with a plurality of pockets 10 (Fig. 3), said pockets corresponding to the number of locking units L. The pockets are preferably rectangular in shape and for each pocket a felly is provided with a protrusion or extension 11, said protrusion or extension occurring directly beneath the pocket, as illustrated in Figures 2 and 3. Upon the outer side of the felly F there is secured a ring 13 by rivets 12, said ring having a recess for each of the pockets 10 as best shown in Figure 4. Each pocket 10 has its rear wall 14 provided with an opening 15' in which there is positioned the inner end of a latch member generally indicated by the reference numeral 15, said end of latch member being pivotally supported by a pin 16 and adapted for upward and downward swinging movement. In the bottom wall 17 of the pocket 10 there is provided a suitable opening for receiving a bushing 18, said bushing having fitted in its upper end the one end of a coil spring 19, the other end of said coil spring engaging the free end of the latch member 15 and seated in a recess 20 formed in said latch member. Extending through the coil spring 19 is a cable 21 having its upper end secured to the free end of the latch member 15 and its lower end extending through the bushing 18 and threaded through a washer plate 22 in the lower end of said bushing. The lower end of the cable 21 has secured thereto a ring 23 whereby the latch member may be manually drawn downward against the tension of the spring 19.

The latch member 15 is adapted to engage a pawl 24 for holding the same within the pocket 10. The latch member is formed upon its upper face with a notch 25 adapted to receive the protrusion or projection 26 of the pawl 24. The pawl 24 is formed at its end opposite to the end having the protrusion 26 with a threaded shank 27, said shank extending through an opening 28 in a rim locking member 29. The rim locking member is substantially rectangular in shape as best shown in Figure 5, and at its upper end is formed upon its inner side with a projection or lug 30. The lower end of the locking member is formed with an inwardly extending projection 31 through which there extends a pin 32 for pivoting the locking member to the felly F. The locking member is adapted to swing outwardly and downwardly and to carry therewith the pawl 24. The inner side of the locking member 29 may be covered with felt or the like as indicated at 33, Figure 4.

Upon the inner side of the felly and the lower edge thereof there is provided a recess 34 into which the one end of a link 35 extends and said link being pivotally supported by a pin 36. The other end of the link is disposed between the projections 37, upon the one end of a cover plate 38 and pivotally connected thereto by a pin 39. The cover plate 38 has its upper face provided with a depression 40 into which the ring 23 carried by the cable 21 may be disposed. The outer end of the cover plate 38 is formed with a flange portion 41 and also the block portions 42, said block portions and flange being adapted to fit upon the lower end of the locking member 29 when said cover is in its raised position as illustrated in Figure 4. Also the cover carries a pin 42′ terminating at its upper end in a loop 43, said pin being adapted to project into an opening 44′ in the locking member 29. In one side of the locking member 29 there is threaded a screw 44 which is adapted to be brought to pass through the loop 43 of the pin 42′ and hold the cover 38 in its raised position. The outer end of the cover is provided with the flange 41 and blocks 42 for the purpose to reinforce the same so that it may serve as a mud guard or protector to the locking member 29.

In Figure 4 a clincher ring R′ is shown as fitted upon the felly of the wheel. The rim 45 is held against removal from one side of the wheel felly by the enlargement or rib 47 and against removal from the other side of the wheel felly by the ring R and locking units of the present invention. Also suitable studs 46 or rivets may be employed for holding the rim 45 in position upon the felly of the wheel.

In the use of the present invention when it is desired to position a ring R upon a wheel felly, the cover 39 of each locking link should be released and the ring 22 of each locking link is grasped and the latch member 15 pulled downwardly to disengage the pawl 24 and thus in an obvious manner permit the locking member 29, to be swung outwardly upon the pivot pin 32. The clincher ring R may now be positioned upon the felly of the wheel and the locking members 29 again placed in their locked position as illustrated in Figures 2 and 4. In bringing the locking members 29 to the last-named or locking position the same can be swung upwardly until the projections 24 thereof engage the latch members 15 and with the slight pressure for further swinging the locking members 29 inwardly the latch members 15 will be depressed and engage with the extensions 24. The covers 38 may now be lifted and the pins 44 inserted to hold these covers in their raised position.

I claim:—

1. A locking device for clincher rings comprising a locking member adapted to be connected to a wheel felly whereby to be swung inwardly for engaging a clincher ring upon the felly, a projection carried by the locking member adapted to extend into a recess formed in the felly, and means within the recess of said felly adapted to engage the projection of the locking member when in its last-named position and hold said locking member against return movement.

2. A locking device for clincher rings comprising a locking member adapted to be connected to a wheel felly whereby to be swung inwardly for engaging a clincher ring upon the felly, a projection carried by the locking member adapted to extend into a recess formed in the felly, and a spring-pressed latch member carried by the felly and disposed within said recess, said latch member being adapted to engage the projection upon said locking member whereby to lock the same in its last-named position.

3. A locking device for clincher rings comprising a locking member adapted to be connected to a wheel felly whereby to be swung inwardly for engaging a clincher ring upon the felly, a projection carried by the locking member adapted to extend into a recess formed in the felly, a spring-pressed latch member carried by the felly and disposed within said recess, said latch member being adapted to engage the projection upon said locking member whereby to lock the same in its last-named position, and means connected to the free end of the latch member adapted to be utilized for withdrawing the latch from engaging relation with said projection.

4. In combination, a wheel felly, a clincher ring thereon, a plurality of locking devices carried by the felly for locking the clincher ring thereon, each locking device comprising a locking member pivoted to the felly for inward swinging movement and thereby to engage the clincher ring, means to hold the locking member in this last-named position, and a cover carried by the felly for each locking member, each cover adapted to be brought to a position concealing and protecting the pivot of the associated locking member.

ISAURO VICIRA DA SILVEIRA.